United States Patent Office 3,034,456
Patented May 15, 1962

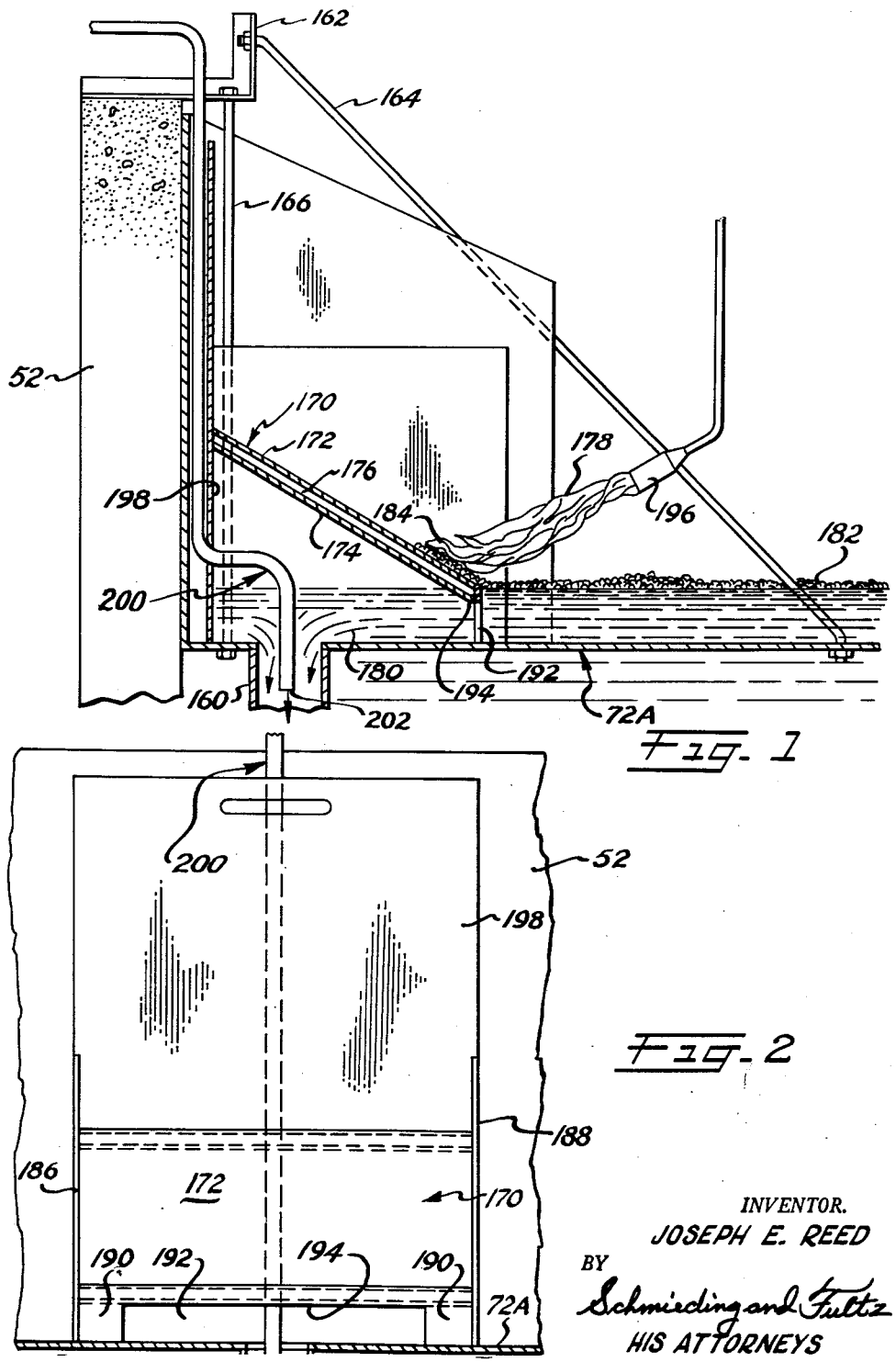

3,034,456
METHOD AND APPARATUS FOR TREATING SEWAGE
Joseph E. Reed, 50 Walnut St., Shelby, Ohio
Filed July 10, 1961, Ser. No. 123,063
13 Claims. (Cl. 110—8)

This invention relates to treatment of sewage and particularly to a novel method and apparatus for removing greasy scum from relatively quiescent baths of sewage.

This application relates to modifications and improvements of method and apparatus disclosed in my co-pending application Serial No. 56,334, filed September 12, 1960. of which this application is a continuation-in-part. My application Serial Number 56,334 is a continuation-in-part of my abandoned application Serial Number, 15,671, filed March 17, 1960..

In municipal sewage treatment plants it is common practice to introduce sewage into settling tanks wherein the bath is relatively quiescent since the sewage progresses through the settling tanks by gravity induced flow. In the course of the settling process, grease present in the sewage accumulates on the surface of the bath and forms a scum.

The grease present in the scum has presented a problem in that it has been necessary to collect it in pits and subsequently pump it into tanks so that it can be hauled away.

In accordance with one aspect of the present invention, a battery of burners and associated flow creating means are mounted along the side of a sewage settling tank in such a manner that surface scum is caused to move into a firing zone wherein the scum is ignited and removed from the bath.

As another aspect of the present invention, each burner and flow creating means is provided with a metal tray that is submerged just below the surface of the bath.

As another aspect of the present invention, the apparatus is provided with a novel firing plate and burner assembly arranged to skin greasy scum from a surface flow of sewage that is caused to converge to the firing zone wherein the scum is burned.

It is therefore an object of the present invention to provide a novel method and apparatus that makes it possible for sewage treatment plants to prevent grease from passing into the waterway into which the effluent from the plant is released.

It is another object of the present invention to provide a novel method and apparatus for efficiently and economically disposing of grease encountered in sewage treatment operations.

Further objects and advantages of the present invention will be apparent from the following description, reference being had to the accompanying drawings wherein a preferred form of embodiment of the invention is clearly shown.

In the drawings:

FIG. 1 is a side sectional view of a grease burning apparatus constructed in accordance with the present invention, the section being taken along a vertical plane through the center line of the apparatus; and FIG. 2 is a front elevational view of the apparatus of FIG. 1.

Referring in detail to the drawings, FIGS. 1 and 2 illustrate a grease burning apparatus constructed in accordance with the present invention. A plurality of these apparatus are mounted along a wall of conventional settling tank of the type used in municipal sewage treatment plants.

These settling tanks are similar to the aeration tanks illustrated in my co-pending application Serial Number 56,334, filed September 12, 1960, in that sewage is continuously introduced and withdrawn from the tank. Settling tanks, however, differ from aeration tanks in that the former do not include means for releasing air flows from beneath the surface of the bath to create circulation. Hence, it will be understood that the bath in a settling tank is relatively quiescent.

The apparatus of FIGS. 1 and 2 includes a tray means 72-A provided with a downwardly extended collector pipe 160 which may be in the form of a straight walled pipe or a pipe with a converging lower end as shown in my co-pending application Serial Number 56,334, filed September 12, 1960.

The tray is mounted to side wall 52 of a settling tank by means of a bracket 162 and tie rods 164 and 166. These tie rods are preferably provided with threaded ends or turn-buckles so that the tray can be mounted such that the upper edge is just below the surface level of the bath in tank 50.

With continued reference to FIGS. 1 and 2, the apparatus includes a skimmer and firing plate means indicated generally at 170 which includes a front wall 172 and a lower wall 174 separated by an air space 176. This composite firing plate construction serves to insulate a firing zone 184 developed by a flame 178 from the cooling effects of bath 180 whereby the heat is concentrated and effectively used in burning the grease scum 182 in firing zone 184.

Referring again to FIGS. 1 and 2, the firing plate means 170 includes side walls 186 and 188 and front wall 190, the latter being provided with an opening 192.

The lower edge 194 of firing plate means 170 is disposed just below the surface of bath 180 whereby said lower edge 194 skims the grease scum from the surface of the bath and presents it to firing zone 184 where a flame 178 is directed to the firing zone by a burner 196.

As seen in FIGS. 1 and 2, a collector pipe 160, or a plurality of such collector pipes, are disposed beneath firing plate 170 and within the confines of side walls 186 and 188, back wall 198, and front wall 190 such that collector pipe 160 creates a flow of surface strata through opening 192.

In accordance with the present invention, flow through collector pipe 160 is introduced by extending a conduit indicated generally at 200 downwardly into collector pipe 160 as seen in FIG. 1. Conduit 200 is connected to a source of pressurized fluid such as a pump, not illustrated, and includes an open lower end 202 that discharges a rapidly moving flow of fluid, such as water, and thereby creates a pumping action within flow collector pipe 160 whereby the surface strata of bath 180 is caused to progress into flow collector pipe 160 and move greasy scum 182 into the firing zone where it is burned by flame 178.

While the form of embodiment of the present invention as herein disclosed constitutes a preferred form, it is to be understood that other forms might be adopted, all coming within the scope of the claims which follow:

I claim:

1. The steps in the method for removing greasy scum from the surface of a relatively quiescent bath of sewage which method comprises discharging a downwardly directed flow of fluid into said bath at a firing zone on the surface of said bath to cause said greasy scum to move along the surface of said bath and into said firing zone; and directing a flame against said greasy scum to burn said scum in said firing zone 2. An apparatus for removing greasy scum from the surface of a relatively quiescent bath of sewage comprising, in combination, tank means for containing a bath of sewage, said tank means including a bath surface level zone; a flow collector pipe disposed in said tank means and including an intake located at said surface level zone; means forming a firing zone at said intake of said flow collector pipe; means for igniting said substances in said firing zone; and means for discharging a flow of fluid into said flow collector pipe for circulating liquid from said bath therethrough and thereby cause said greasy scum to progress into said firing zone.

3. An apparatus for removing greasy scum from the surface of a relatively quiescent bath of sewage comprising, in combination, tank means for containing a bath of sewage, said tank means including a bath surface level zone; a flow collector pipe disposed in said tank means and including an intake located at said surface level zone; means forming a firing zone at said intake of said flow collector pipe; means for igniting said substances in said firing zone; and an open ended conduit extended downwardly into said flow collector pipe for discharging a flow of fluid into said flow collector pipe for circulating liquid from said bath therethrough and thereby cause said greasy scum to progress into said firing zone.

4. An apparatus for removing greasy scum from the surface of a relatively quiescent bath of sewage comprising, in combination, tank means for containing a bath of sewage, said tank means including a bath surface level zone; a flow collector pipe disposed in said tank means and including an intake located at said surface level zone; means forming a firing zone at said intake of said flow collector pipe; means for igniting said substances in said firing zone; means for discharging a flow of fluid into said flow collector pipe for circulating liquid from said bath therethrough and thereby cause said greasy scum to progress into said firing zone; and tray means located at said intake of said flow collector pipe.

5. An apparatus for removing greasy scum from the surface of a relatively quiescent bath of sewage comprising, in combination, tank means for containing a bath of sewage, said tank means including a bath surface level zone; a flow collector pipe disposed in said tank means and including an intake located at said surface level zone; means forming a firing zone at said intake of said flow collector pipe; means for igniting said substances in said firing zone; an open ended conduit extended downwardly into said flow collector pipe for circulating liquid from said bath therethrough and thereby cause said greasy scum to progress into said firing zone; and tray means located at said intake of said flow collector pipe.

6. The apparatus defined in claim 2 that includes a firing plate means disposed in said firing zone and said igniting means comprising burner means for directing a flame against said firing plate means.

7. The apparatus defined in claim 2 that includes a firing plate means disposed in said firing zone and said igniting means comprising burner means for directing a flame against said firing plate means, said firing plate means including a lower edge at said surface level zone for skimming the surface of said bath.

8. The apparatus defined in claim 3 that includes a firing plate means disposed in said firing zone and said igniting means comprising burner means for directing a flame against said firing plate means.

9. The apparatus defined in claim 3 that includes a firing plate means disposed in said firing zone and said igniting means comprising burner means for directing a flame against said firing plate means, said firing plate means including a lower edge at said surface level zone for skimming the surface of said bath.

10. The apparatus defined in claim 4 that includes a firing plate means disposed in said firing zone and said igniting means comprising burner means for directing a flame against said firing plate means.

11. The apparatus defined in claim 4 that includes a firing plate means disposed in said firing zone and said igniting means comprising burner means for directing a flame against said firing plate means, said firing plate means including a lower edge at said surface level zone for skimming the surface of said bath.

12. The apparatus defined in claim 5 that includes a firing plate means disposed in said firing zone and said igniting means comprising burner means for directing a flame against said firing plate means.

13. The apparatus defined in claim 5 that includes a firing plate means disposed in said firing zone and said igniting means comprising burner means for directing a flame against said firing plate means, said firing plate means including a lower edge at said surface level zone for skimming the surface of said bath.

No references cited.